(12) United States Patent
Blaser et al.

(10) Patent No.: US 9,006,137 B2
(45) Date of Patent: Apr. 14, 2015

(54) ADSORBENT MATERIAL WITH ANISOTROPIC LAYERING

(71) Applicant: Ford Global Technologies, LLC, Dearborn, MI (US)

(72) Inventors: Rachel Blaser, New Hudson, MI (US); Michael J. Veenstra, Southgate, MI (US); Chunchuan Xu, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 128 days.

(21) Appl. No.: 13/893,140

(22) Filed: May 13, 2013

(65) Prior Publication Data

US 2014/0332711 A1 Nov. 13, 2014

(51) Int. Cl.
*F17C 11/00* (2006.01)
*C01B 3/00* (2006.01)

(52) U.S. Cl.
CPC .................. *C01B 3/0084* (2013.01)

(58) Field of Classification Search
CPC ............ C01B 3/00; H01M 8/00; F17C 11/00; F17C 11/005; F17C 11/007; F17C 2221/012; F17C 2221/032; F17C 2221/033; B01D 53/02
USPC ......................... 502/429, 428, 416, 417, 424; 252/188.25; 205/457; 95/90; 427/213.3, 213.31, 214, 215, 403; 264/241; 428/403; 206/0.7
See application file for complete search history.

(56) References Cited

U.S. PATENT DOCUMENTS

| | | | |
|---|---|---|---|
| 6,113,673 A * | 9/2000 | Loutfy et al. | 95/116 |
| 7,862,646 B2 * | 1/2011 | Carruthers et al. | 95/131 |
| 8,615,812 B2 * | 12/2013 | Wojtowicz et al. | 2/2.5 |
| 8,864,885 B2 * | 10/2014 | Yuasa | 96/153 |
| 8,900,352 B2 * | 12/2014 | Wilmer et al. | 96/108 |
| 2003/0148165 A1 | 8/2003 | Muller et al. | |
| 2004/0127621 A1 | 7/2004 | Drzal et al. | |
| 2007/0227898 A1 | 10/2007 | Muller et al. | |
| 2010/0115970 A1 * | 5/2010 | Lee et al. | 62/46.1 |
| 2011/0297879 A1 | 12/2011 | Jorgensen et al. | |
| 2011/0302933 A1 | 12/2011 | Immel | |
| 2012/0152115 A1 * | 6/2012 | Gerds et al. | 95/90 |
| 2014/0274659 A1 * | 9/2014 | Romanos et al. | 502/5 |

FOREIGN PATENT DOCUMENTS

KR 100961994 B1 6/2010
WO WO 2010072404 A2 * 7/2010

OTHER PUBLICATIONS

Jinsong Zhang et al., "A Review of Heat Transfer Issues in Hydrogen Storage Technologies," Journal of Heat Transfer, Dec. 2005, vol. 127, p. 1391-1399.
D. Liu et al., "MOF-5 composites exhibiting improved thermal conductivity," International Journal of Hydrogen Energy 37, Jan. 20, 2012, http://www.elsevier.com/locate/he, p. 6109-6117.
Justin Purewal et al., "Improved Hydrogen Storage and Thermal Conductivity in High-Density MOF-5 Composites," The Journal of Physical Chemistry C, Sep. 13, 2012, 116 (38), p. 20199-20212.
Carsten Pohlmann et al., "Solid-state hydrogen storage in Hydralloy-graphite composites," Journal of Power Sources 231, http://www.elsevier.com/locate/jpowsour, Dec. 20, 2012, p. 97-105.

* cited by examiner

*Primary Examiner* — Douglas Mc Ginty
(74) *Attorney, Agent, or Firm* — Damian Porcari; Brooks Kushman P.C.

(57) ABSTRACT

In at least one embodiment, a compressed gaseous fuel storage pellet is provided comprising a gas adsorbent material and a thermally conductive material extending substantially an entire dimension of the pellet and having a thermal conductivity of at least 75 W/mK. The pellet may include at least two layers of gas adsorbent material spaced apart along a compression direction of the pellet and a substantially continuous layer of the thermally conductive material disposed between the at least two layers of gas adsorbent material. The pellet may further include thermally conductive projections which intersect the layer(s) of thermally conductive material.

20 Claims, 3 Drawing Sheets

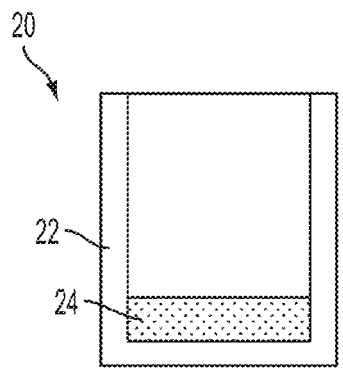 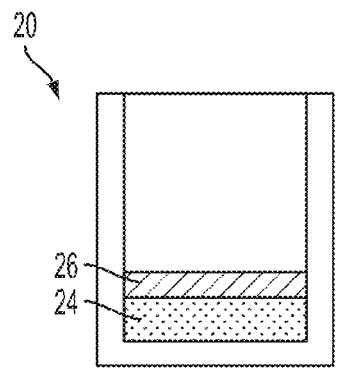
FIG. 4A  FIG. 4B
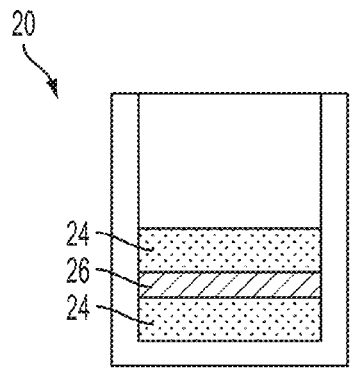 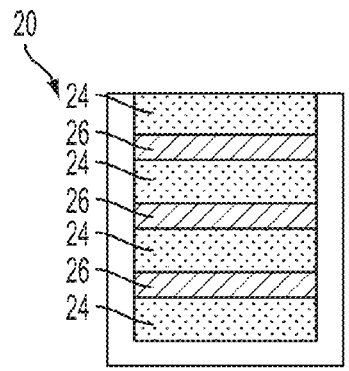
FIG. 4C  FIG. 4D
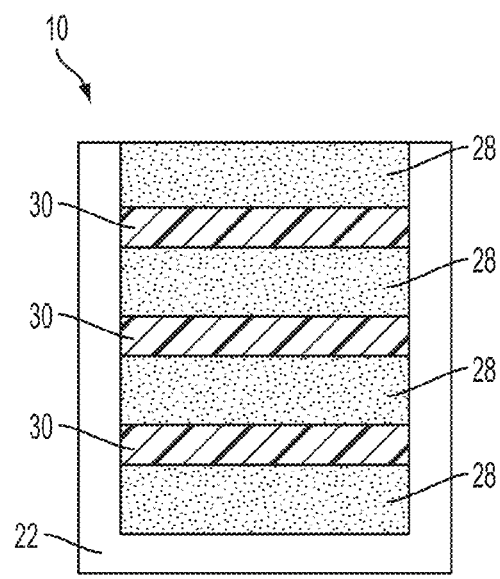
FIG. 5

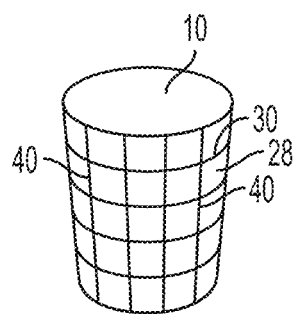
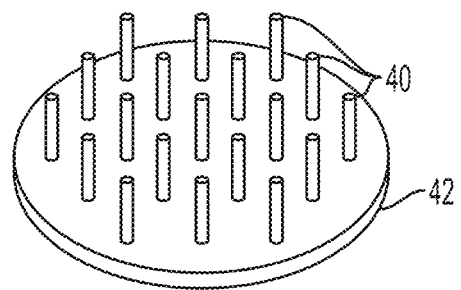
FIG. 6　　　　　　FIG. 7
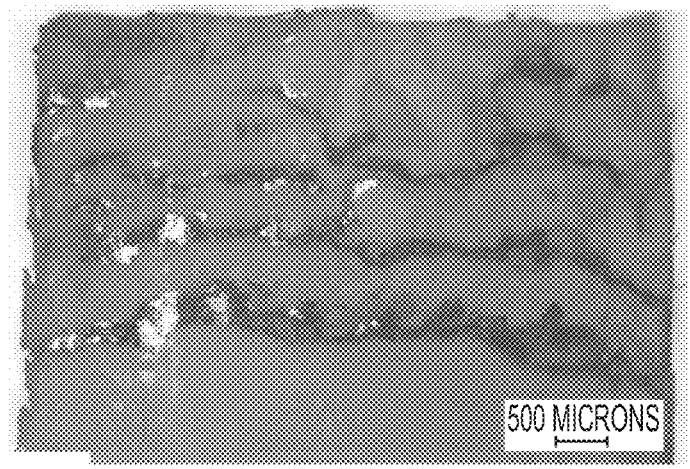
FIG. 8
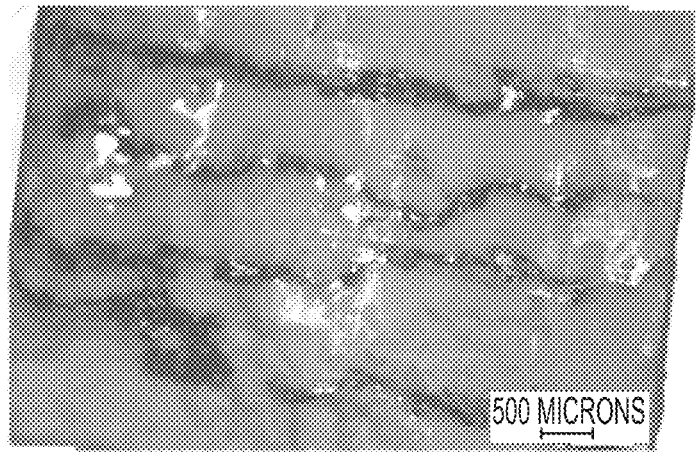
FIG. 9

US 9,006,137 B2

ADSORBENT MATERIAL WITH ANISOTROPIC LAYERING

TECHNICAL FIELD

One or more embodiments relate to an adsorbent material for storing gaseous fuels.

BACKGROUND

One of the challenges of using gaseous energy sources, such as hydrogen and natural gas, is that providing the equivalent storage capacity to gasoline tanks can be difficult. In particular, vehicle applications with limited space require a fuel system that has high energy density at a low cost for providing the expected driving ranges. One option for gaseous energy sources is to use liquefied fuel (e.g., liquid hydrogen or natural gas) in order to reduce volume and increase tank capacity. However, liquefied fuels must be stored at extremely low temperatures, for example, liquefied natural gas (LNG) is stored at about 112 K (−161° C.). Use of liquefied fuels therefore requires periodic venting of storage tanks if the liquid fuel evaporates, and also special equipment to refuel since very low temperature liquids are being handled. Another option is compressed gas storage, in which the fuel is stored under very high pressure (e.g., around 3,000 to 3,600 psig for natural gas and 5,000 to 10,000 psig for hydrogen) at approximately room temperature. However, compressed gas takes up significantly more space than liquid fuel and the equipment required to store such high pressures adds significant cost to the fuel system.

SUMMARY

In at least one embodiment, a compressed gaseous fuel storage pellet is provided comprising a gas adsorbent material and a thermally conductive material extending substantially an entire dimension of the pellet and having a thermal conductivity of at least 75 W/mK. The pellet may further comprise at least two layers of gas adsorbent material spaced apart along a compression direction of the pellet and a substantially continuous layer of the thermally conductive material disposed between the at least two layers of gas adsorbent material.

In one embodiment, the pellet includes 2 to 8 layers of gas adsorbent material and 2 to 8 layers of thermally conductive material, wherein the layers of gas adsorbent material and thermally conductive material are in an alternating pattern. The layers of gas adsorbent material and/or the layers of thermally conductive material may be equally spaced. In one embodiment, a ratio of a thickness of the layers of thermally conductive material to a thickness of the layers of the gas adsorbent material is from 1:15 to 1:3. In another embodiment, a ratio of a thickness of the layers of thermally conductive material to a thickness of the layers of the gas adsorbent material is from 1:12 to 1:4.

The pellet may further comprise a plurality of thermally conductive projections extending substantially an entire height of the pellet parallel to the compression direction of the pellet. In one embodiment, the plurality of projections extend from a base disposed at one end of the pellet. In another embodiment, the plurality of projections are formed of metal. The thermally conductive material may be expanded natural graphite (ENG) and the gas adsorbent material may include a metal-organic framework (MOF), an activated carbon, or a covalent-organic framework (COF).

In one embodiment, the pellet has a thermal conductivity of at least 0.75 W/mK in a direction parallel to the thermally conductive material. In another embodiment, the pellet has a gas permeability in a direction substantially perpendicular to a compression direction that is at least 200% greater than in the compression direction.

In at least one embodiment, a method of forming a compressed gaseous fuel storage pellet is provided comprising layering alternating layers of a gas adsorbent material powder and a high thermal conductivity (HTC) additive, the HTC additive having a thermal conductivity of at least 75 W/mK, and compressing the gas adsorbent material powder and HTC additive in a direction substantially perpendicular to the layers to form a compressed pellet. The HTC additive may be expanded natural graphite (ENG) and the gas adsorbent material powder may be a metal-organic framework (MOF), an activated carbon, or a covalent-organic framework (COF). In one embodiment, the alternating layers of the gas adsorbent material powder and the high thermal conductivity (HTC) additive are layered in a die. The method may further include inserting a plurality of thermally conductive projections into a die prior to the layering step such that the alternating layers are formed around the projections.

In at least one embodiment, a compressed gaseous fuel storage pellet is provided comprising at least three layers of a metal-organic framework (MOF) material spaced apart along a compression direction of the pellet and a substantially continuous layer of expanded natural graphite (ENG) disposed in each space between the at least three spaced apart layers of MOF material.

BRIEF DESCRIPTION OF THE DRAWINGS

FIGS. 4A-4D are schematic cross-sections of a die filling process for forming an adsorbent material and thermally conductive material layered composite pellet according to an embodiment;

FIG. 5 is a pressed layered composite pellet according to the process of FIGS. 4A-4D;

FIG. 6 is a schematic, perspective view of a layered composite pellet including thermally conductive projections according to an embodiment;

FIG. 7 is a schematic, perspective view of thermally conductive projections attached to a base for inclusion in a composite pellet according to an embodiment;

FIG. 8 is a micrograph of a cross-section of a MOF-5 and ENG layered composite pellet having three ENG layers; and FIG. 9 is a micrograph of a cross-section of a MOF-5 and ENG layered composite pellet having four ENG layers.

DETAILED DESCRIPTION

Figure 1:
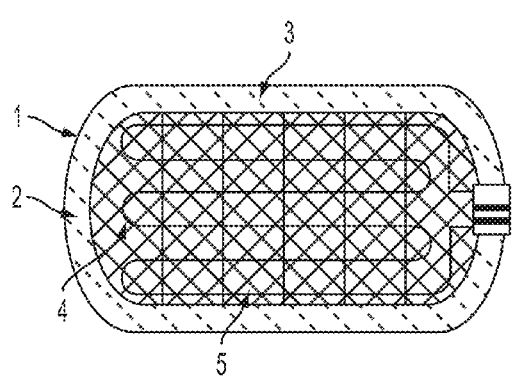
FIG. 1 is a schematic cross-section of a gaseous fuel storage tank.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Adsorbent materials may provide a solution that addresses the problems present for liquefied fuels and compressed gas fuels, such as requiring very low temperature storage or high pressures. Adsorbent materials have very large surface areas and porosities, allowing them to adsorb large amounts of gaseous fuel at low pressures. Examples of materials that may be used as adsorbent materials for gas storage include metal-organic frameworks (MOFs), activated carbons, and covalent-organic frameworks (COFs). A MOF generally includes metal ions or clusters joined by organic linkers. Activated carbon generally has a high level of microporosity and/or high surface area. A COF generally includes building blocks formed of light elements that form strong covalent bonds, such as H, B, C, N, and O, joined by organic linker. A MOF that may be suitable for adsorbent gas storage is MOF-5, which has zinc oxide ($ZnO_4$) clusters linked by terephthalate (1,4 benzenedicarboxylate), however other MOFs may also be used. As an example for hydrogen storage, MOF-5 has a high adsorption capacity at 77 K, it can adsorb at least 7 wt % of hydrogen. MOF-5 may be acquired as a manufactured powder with a tap density of about 0.13 to 0.19 g/cc. Compacted MOF-5 pellets, with a density of 0.5 g/cc, have a total volumetric hydrogen storage density 23% higher than powder MOF-5 at 77K and 100 bar.

Despite their high adsorption capacity, one challenge in using adsorbent materials, such as MOFs, for gas storage is that they have low thermal conductivity. Low thermal conductivity is a common property in highly porous adsorbents and improvement with this property would be beneficial for fuel storage applications because the adsorption of hydrogen on the adsorbent material, for example MOF-5, is an exothermic reaction that raises the temperature of the adsorbent material. The heat of adsorption generated during tank filling must be dissipated in order to allow the adsorbent material to reach its operating temperature of approximately 77 K. The temperature management is needed since the adsorption capacity decreases with increased temperature. Increasing the rate at which the heat is dissipated may therefore allow for faster fueling times and would maximize hydrogen storage on the adsorbent material.

To increase the thermal conductivity of a gas adsorbent material, for example MOF-5, a thermally conductive material, such as a high thermal conductivity (HTC) additive, may be included to form an adsorbent material composite (e.g., a MOF composite or MOF-5 composite). The thermally conductive material (e.g., the HTC additive) may have a thermal conductivity of at least 75 W/mK, 100 W/mK, 125 W/mK, 150 W/mK, or 175 W/mK.

In one embodiment, the additive may be an expanded natural graphite (ENG), which has a thermal conductivity of about 150 W/mK. In another embodiment, the additive may be carbon black or fibers. The composite may include 0.1 to 15 wt % of the HTC additive. In one embodiment, the composite may include 0.1 to 12.5 wt % of the HTC additive. In another embodiment, the composite may include 1.0 to 10 wt % of the HTC additive. In another embodiment, the composite may include 5 to 10 wt % of the HTC additive. In another embodiment, the composite may include 7.5 to 10 wt % of the HTC additive.

Figure 2:
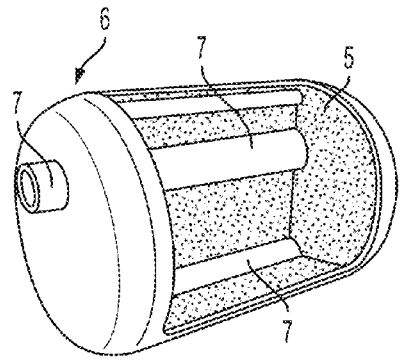
FIG. 2 is a schematic, perspective, cut away view of a heat exchanger containing an adsorbent material according to an embodiment.

With reference to FIG. 1, a gas storage tank 1 is shown having a pressure vessel 2, a vacuum insulated layer 3, heat exchanger 4, and adsorbent material 5. The gas storage tank 1 may store a gaseous fuel, such as hydrogen or natural gas. With reference to FIG. 2, a heat exchanger 6 is shown having adsorbent material 5 disposed inside and having tubes 7 extending along a long axis of the heat exchanger 6. The adsorbent material 5 may include one or more cylindrical pellets 10. A number of heat exchangers 6 having pellets 10 therein may be inserted into the gas storage tank 1 to increase the storage capacity compared to a compressed gas-only tank. In one embodiment, the heat exchangers 6 are arranged such that their tubes 7 are parallel to each other. In another embodiment, the heat exchangers 6 are arranged such that their tubes 7 extend along the same axis. In another embodiment, the heat exchangers 6 are arranged such that their tubes 7 are substantially collinear with each other. Having tubes 7 that are parallel, coaxial, or collinear may increase the effectiveness of the heat exchangers 6 in removing heat from the pellets 10 of adsorbent material.

Figure 3:
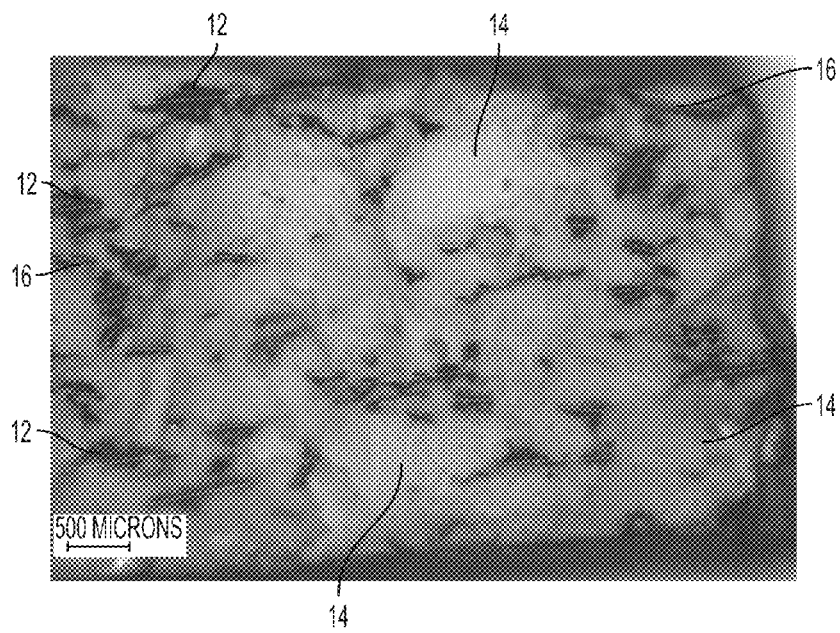
FIG. 3 is a vertical, cross-sectional view of a mixed MOF-5 and ENG composite pellet.

With reference to FIG. 3, a micrograph of a vertical cross-section of a cylindrical compressed pellet 10 of a 5 wt % ENG MOF-5 composite is shown. The pellet was formed by mixing ENG and MOF-5 powder and uniaxially pressing the powder in a cylindrical die. The ENG phases 12 are disbursed within the MOF-5 phases 14 of the pellet 10 and are not linked to one another. While the isolated ENG phases 12 increase the thermal conductivity of the MOF-5 composite, the thermal conductivity is blunted at each ENG-MOF interface 16. The ENG phases 12 include material sometimes referred to as "worms" based on their curvy and fibrous appearance, which tend to exhibit a horizontal orientation preference in the pellet 10 from the compaction of the pellet. Based on the apparent preference for horizontal orientation, thermal conductivity measurements were taken of several pellets 10 having varying amounts of ENG and compact densities. The measurements were taken in both the compression direction (e.g., the long axis of the cylindrical pellet) and across or transverse to the compression direction, or the "cross-compression" direction (e.g., parallel to the orientation preference of the ENG worms). It was found that the orientation preference of the ENG worms 12 resulted in anisotropic thermal conductivity properties in the pellets 10. The thermal conductivity in the cross-compression direction was about 100% to 300% higher than in the compression direction. In addition to increasing the thermal conductivity of the MOF-5 and ENG composite in the cross-compression direction, it has been found that the addition of ENG also increases the permeability of gases in the cross-compression direction by about 100%, depending on the temperature and the assumptions made during testing.

To further improve the thermal conductivity and permeability of the pellets 10, a thermally conductive material (e.g., ENG) may extend substantially an entire dimension of the pellet. The dimension may be the height of the pellet, the width of the pellet, a depth of the pellet, or any other dimension of a pellet that extends from one surface to another through a bulk of the pellet. If the pellet is cylindrical, for example, the dimension may be the height or diameter of the pellet. By extending substantially an entire dimension of the pellet 10, the thermally conductive material may have increased heat transfer compared to a randomly mixed gas adsorbent and thermal conductive material pellets, such as described with reference to FIG. 3. The thermally conductive layer may be continuous and span the entire dimension of the pellet without interruption by the low thermal conductivity adsorbent material, reducing or eliminating the interfaces between the high and low thermal conductivity materials. The thermally conductive material may be layer that extends through a full cross-section of the pellet 10 or it may be a strip or projection that extends through less than a full cross-section of the pellet 10.

With reference to FIGS. 4A-4D, a method 20 of producing a heterogeneous and/or anisotropic composite pellet 10 is illustrated. In FIG. 4A, a die 22 is filled with a first layer 24 of adsorbent material. In FIG. 4B, a subsequent layer 26 of HTC additive is added to the die 22 on top of the layer 24 of adsorbent material. In FIG. 4C, another layer 24 of adsorbent material is added on top of the layer 26 of HTC material. This process may be repeated to form an alternating structure of adsorbent material layers 24 and HTC additive layers 26, as shown in FIG. 4D. The adsorbent material may be a MOF, activated carbon, a COF, or any other suitable material. In at least one embodiment, the adsorbent material is MOF-5. The HTC additive may be ENG, carbon black, or any other suitable material. In at least one embodiment, the HTC additive is ENG.

In the embodiment shown in FIGS. 4A-4D, four HTC additive layers 26 are disposed within five adsorbent material layers 24. However, any suitable number of layers of each material may be present, for example 1 to 10 layers of each material. In another embodiment, 2 to 8 layers of each material may be present. In another embodiment, 3 to 6 layers of each material may be present. The order in which the materials are filled in the die 22 may be switched from that shown in FIGS. 4A-4D (e.g., the HTC additive layer 26 may be the first layer filled). Each layer 24 of adsorbent material may have the same thickness or include the same mass of adsorbent material, however the layers 24 may have different thicknesses or masses. Similarly, each layer 26 of HTC additive may have the same thickness or comprise the same mass of HTC additive, however the layers 26 may have different thicknesses or masses. In addition, the first layer and last layer need not be of the same material (e.g., the first layer may be adsorbent material and the last layer may be HTC additive, or vice versa). After each layer 24, 26 has been filled, a settling process may be performed on the die 22, such as tapping, vibrating, or any other suitable method to cause the powder to condense and form a substantially uniform layer. The settling process may be done after each layer is deposited, after a certain number of layers, or after certain layers and not others.

After all of the layers have been filled or while the layers are being filled, the material in the die is pressed in a direction substantially perpendicular to the layers 24, 26 to form a pellet 10 having layers 28 of adsorbent material and layers 30 of HTC additive, as shown in FIG. 5. Pellets 10 having alternating layers 28 and 30 may provide increased thermal conductivity compared to pellets formed from mixed adsorbent material and HTC additive. The HTC additive layers 30 are substantially continuous across the entire diameter or width of the pellet 10, allowing for increased heat transfer through the HTC additive material and out of the pellet 10. In addition, in embodiments where the HTC additive is ENG, the layers 30 may be aligned in the same direction as the orientation preference of ENG phases in pressed pellets, further increasing the anisotropic heat conduction properties of the pellet 10. The compressed pellet may have a density of 0.2 to 1.0 g/cm$^3$. In one embodiment, the compressed pellet has a density of 0.3 to 0.8 g/cm$^3$. In another embodiment, the compressed pellet may have a density of 0.3 to 0.7 g/cm$^3$. In another embodiment, the compressed pellet may have a density of 0.3 to 0.5 g/cm$^3$. The increased thermal conductivity and heat transfer from the pellet may allow a fuel cell to reach its operating temperature faster than pellets having substantially uniformly mixed adsorbent material and HTC additive.

The layers 28 of adsorbent material may be equally spaced from one another and may have the same thicknesses. In addition, the layers 30 of HTC additive may be equally spaced from one another and may have the same thicknesses. The thicknesses of the layers 30 of HTC additive and the layers 28 of adsorbent material may defined as a ratio. In at least one embodiment, a ratio of the thickness of the layers 30 layers 30 of HTC additive to the thickness of the layers 28 of adsorbent material is from 1:15 to 1:3. In another embodiment, a ratio of the thickness of the layers 30 layers 30 of HTC additive to the thickness of the layers 28 of adsorbent material is from 1:12 to 1:4. In another embodiment, a ratio of the thickness of the layers 30 layers 30 of HTC additive to the thickness of the layers 28 of adsorbent material is from 1:10 to 1:5.

The pellets 10 may have any suitable shape, for example a cylinder or rectangular prism. In one embodiment, the pellets 10 have a height from 3 to 10 mm. In another embodiment, the pellets 10 have a height from 4 to 8 mm. In another embodiment, the pellets 10 have a height from 5 to 7 mm. In one embodiment, the pellets 10 have a width or diameter from 3 to 10 mm. In another embodiment, the pellets 10 have a width or diameter from 4 to 8 mm. In another embodiment, the pellets 10 have a width or diameter from 5 to 7 mm.

In one embodiment, the layers 28 of adsorbent material have a thickness of 0.2 to 2.0 mm. In another embodiment, the layers 28 of adsorbent material have a thickness of 0.25 to 1.75 mm. In another embodiment, the layers 28 of adsorbent material have a thickness of 0.3 to 1.5 mm. In another embodiment, the layers 28 of adsorbent material have a thickness of 0.4 to 1.25 mm. In another embodiment, the layers 28 of adsorbent material have a thickness of 0.5 to 1.0 mm. In one embodiment, the layers 30 of HTC additive have a thickness of 0.1 to 0.5 mm. In another embodiment, the layers 30 of HTC additive have a thickness of 0.1 to 0.4 mm. In another embodiment, the layers 30 of HTC additive have a thickness of 0.15 to 0.35 mm. In another embodiment, the layers 30 of HTC additive have a thickness of 0.15 to 0.3 mm.

The addition of the HTC additive to the composite pellet may increase the thermal conductivity in the direction parallel to the HTC additive (for example, the cross-compression direction in a layered composite pellet) by 300% or more, depending on the density of the composite and the temperature of the testing. In one embodiment, a layered composite pellet may have an increase in thermal conductivity in the cross-compression direction of at least 300%, compared to the cross-compression direction of a randomly mixed pellet of the same density and at the same temperature. In another embodiment, the layered composite pellet may have an increase in thermal conductivity in the cross-compression direction of at least 400%, compared to the randomly mixed pellet. In another embodiment, the layered composite pellet may have an increase in thermal conductivity in the cross-compression direction of at least 500%, compared to the randomly mixed pellet. In another embodiment, the layered composite pellet may have an increase in thermal conductivity in the cross-compression direction of at least 700%, compared to the randomly mixed pellet. In another embodiment, the layered composite pellet may have an increase in thermal conductivity in the cross-compression direction of at least 900%, compared to the randomly mixed pellet.

When measured at 296 K, the composite pellet may have a thermal conductivity of at least 0.75 W/mK, 1.0 W/mK, 1.25 W/mK, or 1.5 W/mK in the direction parallel to the thermally conductive material (e.g., an HTC additive, such as ENG). In one embodiment, a layered composite pellet may have a thermal conductivity of at least 0.75 W/mK in the cross-compression direction. In another embodiment, the layered composite pellet may have a thermal conductivity of at least 1.0 W/mK in the cross-compression direction. In another embodiment, the layered composite pellet may have a thermal conductivity of at least 1.25 W/mK in the cross-compression direction. In another embodiment, the layered composite pellet may have a thermal conductivity of at least 1.5 W/mK in the cross-compression direction. In another embodiment, the layered composite pellet may have a thermal conductivity of 0.75 to 1.5 W/mK in the cross-compression direction. In another embodiment, the layered composite pellet may have a thermal conductivity of 1.0 to 1.25 W/mK in the cross-compression direction.

Alternating layers of adsorbent material and HTC additive also increase the gas permeability of the pellet 10 in the cross-compression direction compared to mixed adsorbent and HTC additive pellets. Permeability varies according to density and temperature, however, when compared at the same density and temperature, layered pellets 10 are more permeable in the cross-compression direction than mixed pellets. As described above with reference to FIG. 3, mixed pellets have a permeability in the cross-compression direction that is about 100% greater than in the compression direction. In one embodiment, the layered pellets 10 have a permeability in the cross-compression direction that is at least 200% greater than in the compression direction. In another embodiment, the layered pellets 10 have a permeability in the cross-compression direction that is at least 250% greater than in the compression direction. In another embodiment, the layered pellets 10 have a permeability in the cross-compression direction that is at least 300% greater than in the compression direction. Accordingly, the layered pellets 10 show an even greater anisotropic permeability than mixed pellets, which may allow for improved gas storage and release.

With reference to FIGS. 6 and 7, in addition to or instead of the layering of adsorbent material and HTC additive, the pellet 10 may be formed on projections 40 or the projections 40 may be inserted into the pellet 10 after it is formed. The projections 40 may be formed as pins, rods, hollow tubes, or any other suitable shape. The projections 40 may extend across substantially one dimension of the pellet 10, such as in the compression or axial direction or in the cross-compression or transverse direction. The projections 40 may extend across substantially an entire height or width of the pellet 10. The projections 40 may be attached to a base 42. The projections and/or the base 42 may be made of any suitable thermally conductive material, such as a metal or conductive carbon. In one embodiment, the projections 40 are made of aluminum. The projections 40 may be cylindrical, however, the projections 40 may have any suitable cross-section, such as square, rectangular, elliptical, triangular, or others. The projections 40 may be uniformly spaced from one another at any suitable interval. Similar to the layers 30 of HTC additive discussed with reference to FIGS. 3-5, the projections 40 provide the pellet 10 with increased thermal conductivity by transporting heat out of the pellet 10 at a rate faster than either an adsorbent material-only pellet or an adsorbent material and HTC additive composite pellet.

In at least one embodiment, the pellet 10 has layers 28 of adsorbent material (e.g., MOF-5) and layers 30 of HTC additive (e.g., ENG), as described with reference to FIGS. 4 and 5 and has a plurality of projections 40 embedded within. The layers 28, 30 may be transverse to the projections 40, for example, perpendicular to the projections 40. In embodiments with both layers 28, 30 and projections 40, the layers and projections 40 may intersect and provide further increased thermal conductivity in the pellet 10 by removing heat in both the axial and transverse directions of the pellet. If present, the base 42 may provide a large surface area at one end surface of the pellet 10 to further conduct heat away from the pellet 10.

EXAMPLES

A MOF-5 composite pellet was prepared with 8.6 wt % ENG. The MOF-5 powder was divided into four equal portions and the ENG was divided into three equal portions (by weight). The MOF-5 powder and ENG portions were alternately inserted into a cylindrical die having a diameter of 6 mm and a height of 6 mm, starting and ending with layers of MOF-5 powder. The die was tapped after each layer was inserted and each layer completely covered the prior layer. After all the layers were filled, the pellet was pressed to form a pellet having a density of 0.333 g/cm$^3$. A vertical cross-section was taken and, as shown in FIG. 8, the ENG layers are substantially continuous and connected across the diameter of the pellet.

A MOF-5 composite pellet was prepared with 8.83 wt % ENG. The MOF-5 powder was divided into five portions and the ENG was divided into four portions (by weight). The MOF-5 powder and ENG portions were alternately inserted into a cylindrical die having a diameter of 6 mm and a height of 6 mm, starting and ending with layers of MOF-5 powder. The die was tapped after each layer was inserted and each layer completely covered the prior layer. After all the layers were filled, the pellet was pressed to form a pellet having a density of 0.337 g/cm$^3$. A vertical cross-section was taken and, as shown in FIG. 9, the ENG layers are substantially continuous and connected across the diameter of the pellet.

A MOF-5 composite pellet was prepared with 10 wt % ENG. The MOF-5 powder was divided into four equal portions and the ENG was divided into three equal portions (by weight). The MOF-5 powder and ENG portions were alternately layered into a cylindrical die and pressed to form a pellet having a density of 0.431 g/cm$^3$. A MOF-5 composite pellet was prepared with 10 wt % ENG. The MOF-5 and ENG were mixed prior pressing to a density of 0.443 g/cm$^3$. Gas permeability testing was done in the compression direction on the mixed composite pellet and in the cross-compression direction on the layered pellet. The tests were run at 296 K. The results are shown in Table 1, below, along with similar testing done for a 5 wt % mixed pellet in both the compression and cross-compression directions. The units for permeability are listed in Darcy using uncompressed gas equations (K) and compressed gas equations ($K_c$).

TABLE 1

Gas permeability measurements for layered and mixed composite pellets.

| Pellet | Direction | Density (g/cm$^3$) | K (Darcy) | $K_c$ (Darcy) | % Increase (K, $K_c$) |
|---|---|---|---|---|---|
| 10 wt % layered | cross-compression | 0.431 | 0.0468 | 0.0258 | 300%, 361% |
| 10 wt % mixed | compression | 0.443 | 0.0117 | 0.0056 | |
| 5 wt % mixed | cross-compression | 0.404 | 0.0409 | 0.0214 | 47%, 16% |
| 5 wt % mixed | compression | 0.404 | 0.0278 | 0.0185 | |

As shown in Table 1, the anisotropic effect of the layered composite pellet is greater than in the mixed composite pellet. Using both uncompressed and compressed gas equations, the layered composite pellet permeability was at least 300% (four times) greater in the cross-compression direction compared to the compression direction in a mixed composite pellet, at room temperature. In comparison, the mixed composite pellet permeability was only up to 47% greater in the cross-compression direction compared to the compression direction in a mixed composite pellet, at room temperature. The layered composite pellet therefore showed substantially increased permeability in the cross-compression direction compared to the mixed composite pellet.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A gas storage tank containing a compressed gaseous fuel storage pellet comprising:
    a gas adsorbent material; and
    a thermally conductive material extending substantially an entire dimension of the pellet and having a thermal conductivity of at least 75 W/mK.

2. The gas storage tank of claim 1, wherein the pellet further comprises at least two layers of gas adsorbent material spaced apart along a compression direction of the pellet; and
    a substantially continuous layer of the thermally conductive material disposed between the at least two layers of gas adsorbent material.

3. The gas storage tank of claim 2, wherein the pellet further comprises a plurality of layers of gas adsorbent material and a plurality of layers of thermally conductive material, wherein the layers of gas adsorbent material and thermally conductive material are in an alternating pattern.

4. The gas storage tank of claim 3, wherein the layers of gas adsorbent material are equally spaced.

5. The gas storage tank of claim 3, wherein the layers of thermally conductive material are equally spaced.

6. The gas storage tank of claim 3, wherein a ratio of a thickness of the layers of thermally conductive material to a thickness of the layers of the gas adsorbent material is from 1:15 to 1:3.

7. The gas storage tank of claim 3, wherein a ratio of a thickness of the layers of thermally conductive material to a thickness of the layers of the gas adsorbent material is from 1:12 to 1:4.

8. The gas storage tank of claim 2, wherein the pellet further comprises a plurality of thermally conductive projections extending substantially an entire height of the pellet parallel to the compression direction of the pellet.

9. The gas storage tank of claim 8, wherein the plurality of projections extend from a base disposed at one end of the pellet.

10. The gas storage tank of claim 8, wherein the plurality of projections are formed of metal.

11. The gas storage tank of claim 1, wherein the thermally conductive material is expanded natural graphite (ENG).

12. The gas storage tank of claim 1, wherein the gas adsorbent material includes a metal-organic framework (MOF), an activated carbon, or a covalent-organic framework (COF).

13. The gas storage tank of claim 1, wherein the pellet has a thermal conductivity of at least 0.75 W/mK in a direction parallel to the thermally conductive material.

14. The storage tank of claim 1, wherein the pellet has a gas permeability in a direction substantially perpendicular to a compression direction that is at least 200% greater than in the compression direction.

15. A method of forming a compressed gaseous fuel storage pellet comprising:
    layering alternating layers of a gas adsorbent material powder and a high thermal conductivity (HTC) additive, the HTC additive having a thermal conductivity of at least 75 W/mK;
    compressing the gas adsorbent material powder and HTC additive in a direction substantially perpendicular to the layers to form a compressed pellet; and
    placing the compressed pellet in a gas storage tank.

16. The method of claim 15, wherein the HTC additive is expanded natural graphite (ENG).

17. The method of claim 15, wherein the gas adsorbent material powder is a metal-organic framework (MOF), an activated carbon, or a covalent-organic framework (COF).

18. The method of claim 15, wherein the alternating layers of the gas adsorbent material powder and the high thermal conductivity (HTC) additive are layered in a die.

19. The method of claim 18 further comprising inserting a plurality of thermally conductive projections into the die prior to the layering step such that the alternating layers are formed around the projections.

20. A gas storage tank containing a compressed gaseous fuel storage pellet comprising:
    at least three layers of a metal-organic framework (MOF) material spaced apart along a compression direction of the pellet; and
    a substantially continuous layer of expanded natural graphite (ENG) disposed in each space between the at least three spaced apart layers of MOF material.

* * * * *

UNITED STATES PATENT AND TRADEMARK OFFICE
CERTIFICATE OF CORRECTION

| | | |
|---|---|---|
| PATENT NO. | : 9,006,137 B2 | Page 1 of 1 |
| APPLICATION NO. | : 13/893140 | |
| DATED | : April 14, 2015 | |
| INVENTOR(S) | : Rachel Blaser et al. | |

It is certified that error appears in the above-identified patent and that said Letters Patent is hereby corrected as shown below:

IN THE SPECIFICATION

COLUMN 1 LINE 8 INSERT,

-- STATEMENT REGARDING FEDERALLY SPONSORED
RESEARCH OR DEVELOPMENT

The invention was made with Government support under Contract No. DE-FC36-09GO19002 awarded by the Department of Energy. The Government has certain rights to the invention. --

Signed and Sealed this
Nineteenth Day of January, 2016

Michelle K. Lee
*Director of the United States Patent and Trademark Office*